A. G. KINYON.
APPARATUS FOR USING POWDERED FUEL.
APPLICATION FILED DEC. 11, 1917.
1,396,761.
Patented Nov. 15, 1921.
5 SHEETS—SHEET 5.
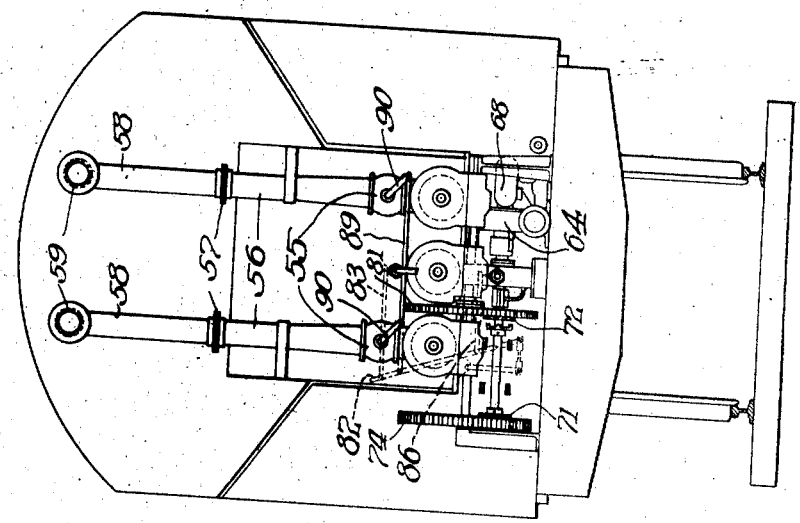
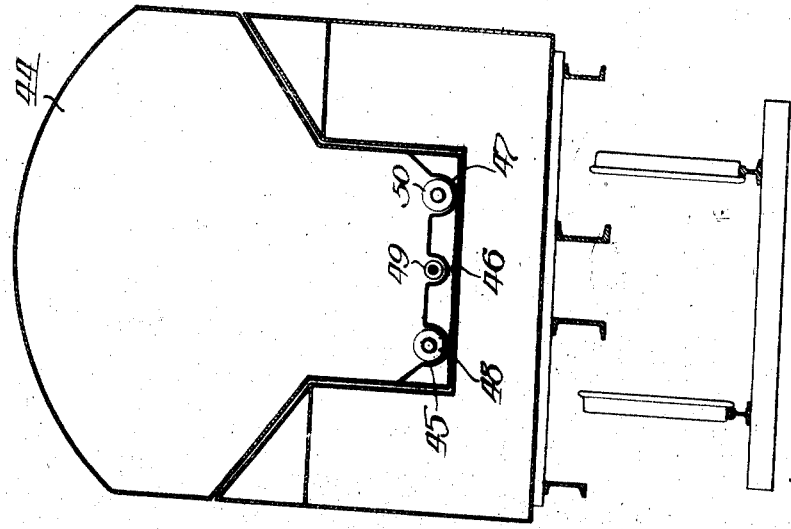

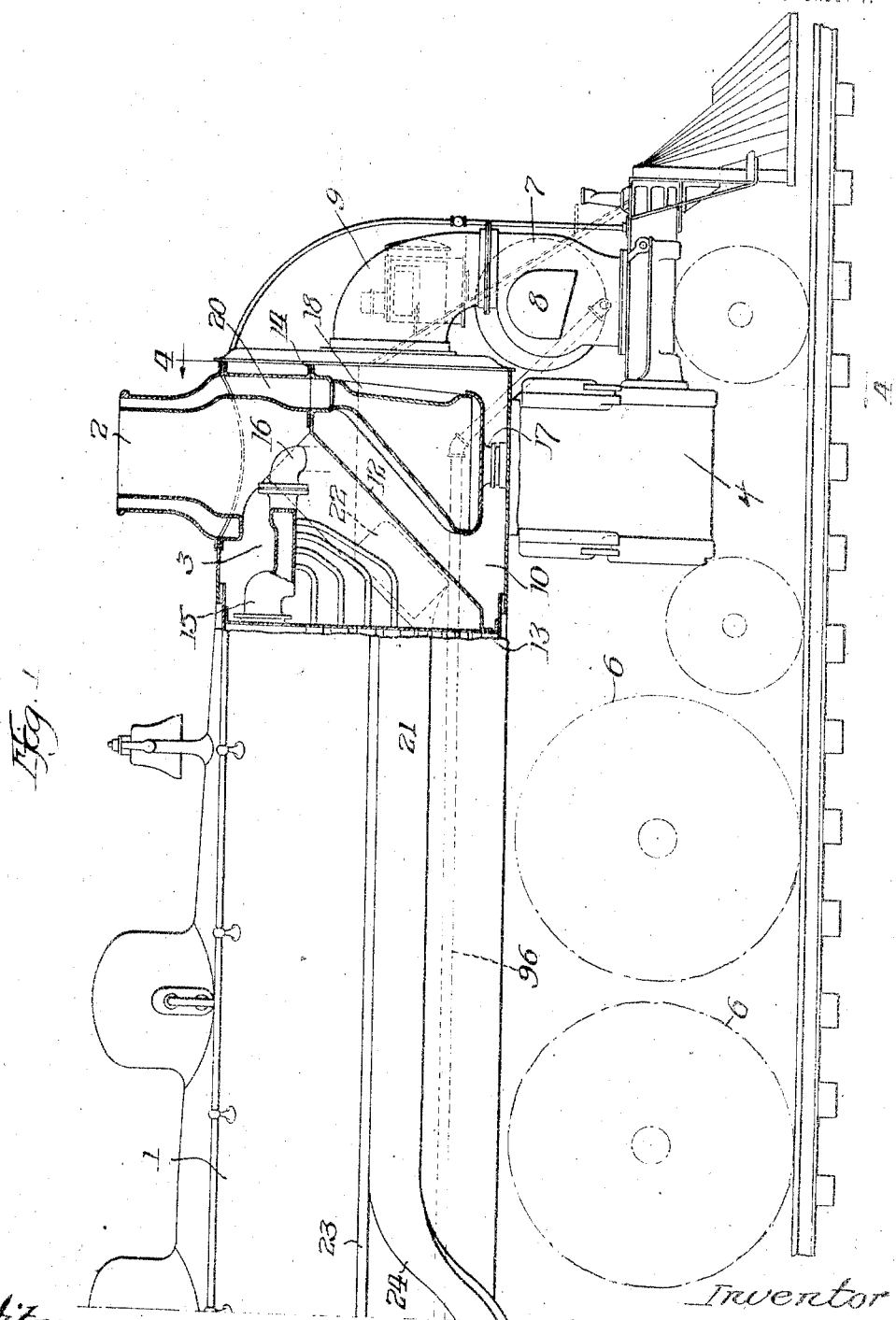

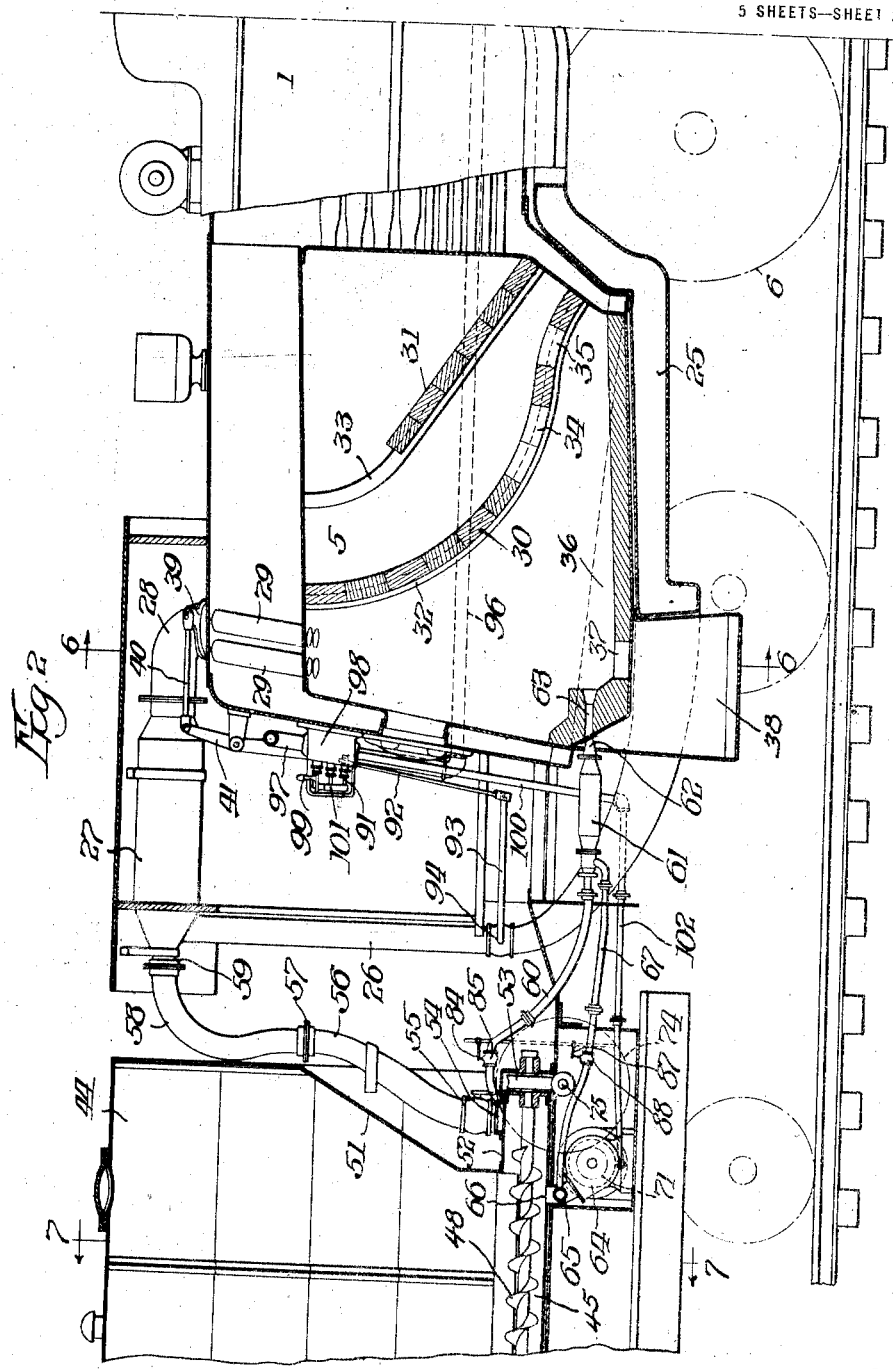

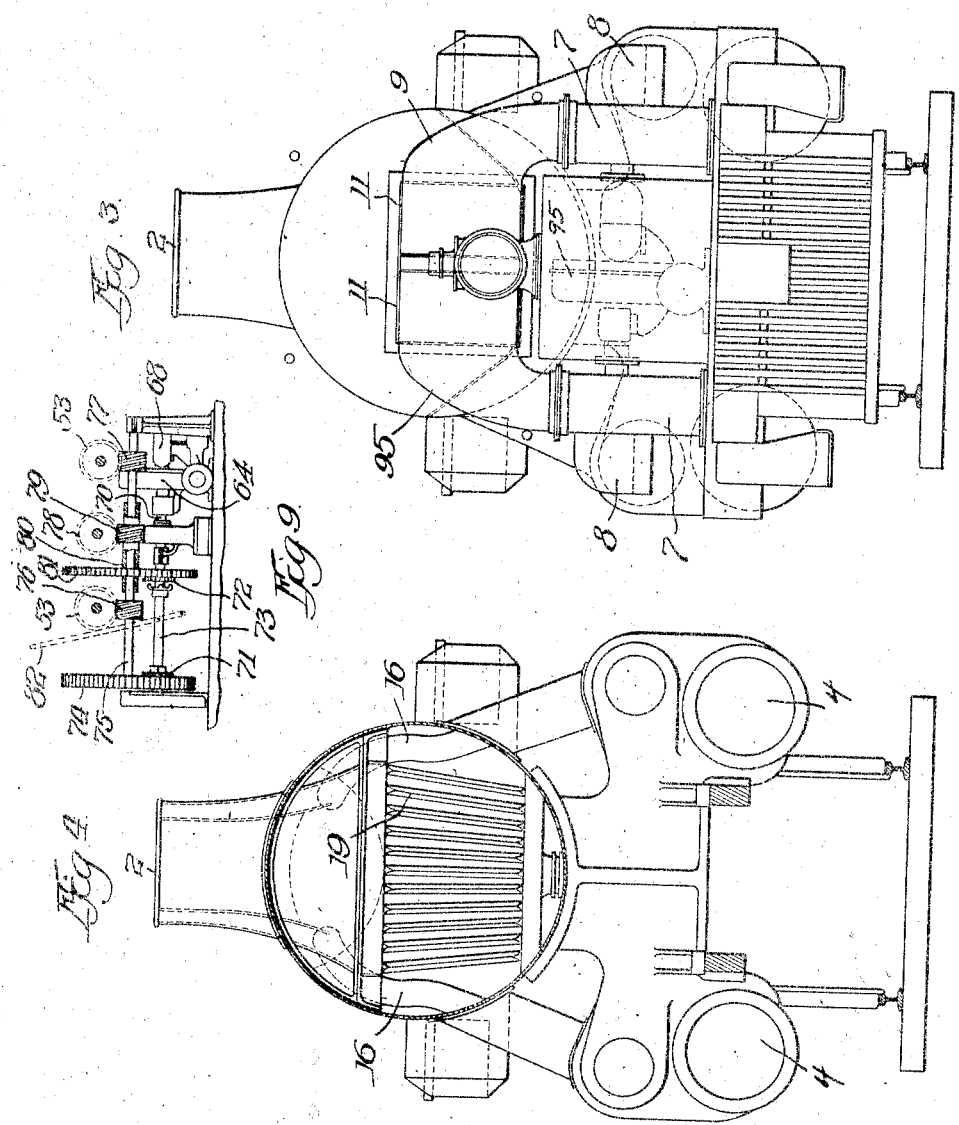

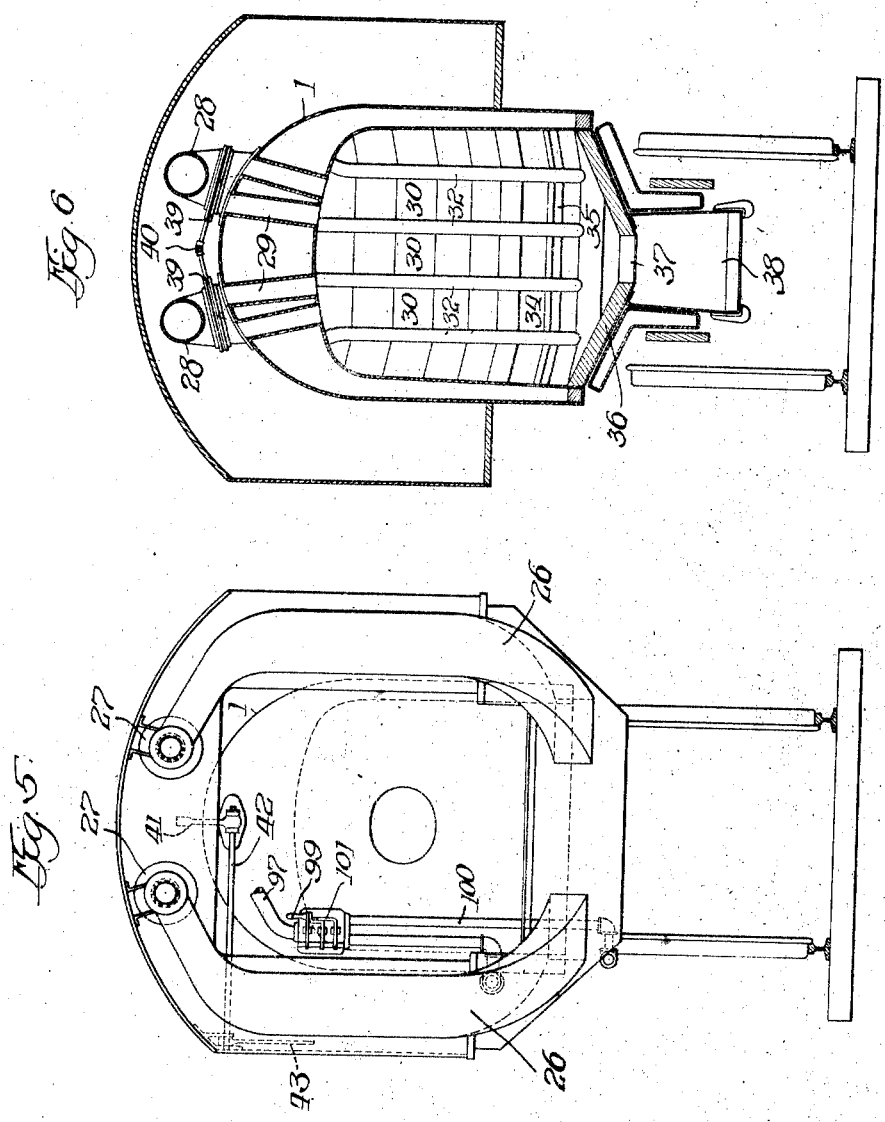

UNITED STATES PATENT OFFICE.

ALONZO G. KINYON, OF CHICAGO, ILLINOIS, ASSIGNOR TO POWDERED COAL ENGINEERING & EQUIPMENT COMPANY, OF CHICAGO, ILLINOIS, A CORPORATION OF DELAWARE.

APPARATUS FOR USING POWDERED FUEL.

1,396,761.  Specification of Letters Patent.  Patented Nov. 15, 1921.

Application filed December 11, 1917. Serial No. 206,639.

*To all whom it may concern:*

Be it known that I, ALONZO G. KINYON, a citizen of the United States, residing at Chicago, in the county of Cook and State of Illinois, have invented certain new and useful Improvements in Apparatus for Using Powdered Fuel, of which the following is a specification.

My invention relates more particularly to feeding powdered fuel to locomotive fire-boxes mixed with the air which is to support the combustion thereof and contemplates heating the air prior to its mixture with the pulverized fuel by means of the exhaust steam, the heat of the boiler and of the fire-box so that the mixture of air and powdered fuel when it enters the fire-box will have a relatively high temperature. Thus the combustible mixture will be more readily ignited and less of the heat of combustion of the mixture will be required to bring the new increments of mixed air and fuel to the ignition temperature. Other features of my invention will appear from the following description taken in connection with the accompanying drawing and from the appended claims. It is to be understood, however, that the specific disclosure is for the purpose of exemplification only and that the scope of the invention is defined in the claims in which I have endeavored to distinguish it from the prior art, so far as known to me, without, however, relinquishing or abandoning any portion or feature thereof.

In the drawings, Figure 1 is a side elevation, partly in vertical section of the front end of a locomotive embodying my invention; Fig. 2 a similar view of the rear end of the locomotive and the forward end of its tender; Fig. 3 is a front elevation of the same; Fig. 4 a vertical transverse section on the line 4—4 of Fig. 1, parts being shown in elevation; Fig. 5 a rear elevation of the locomotive; Fig. 6 a transverse vertical section thereof on the line 6—6 of Fig. 2. Fig. 7 is a transverse vertical section on the line 7—7 of Fig. 2; Fig. 8 a front view of the tender and Fig. 9 an elevation of a detail.

Each part is identified by the same reference characters wherever it occurs throughout the several views.

Referring now more particularly to Figs. 1 and 2, except in the respects hereinafter pointed out, the engine and tender are or may be of any usual or approved design comprising the boiler 1, smoke-stack 2, smoke-box 3, cylinders 4, fire-box 5 and wheels 6, the last-named being shown in dotted lines. The air for combustion is taken in at the front of the engine and into the extension space where it is heated by the exhaust steam prior to being mixed with the fuel. For the purpose of supplying the air a pair of fans, 7, 7, (see Figs. 1 and 3) are mounted on opposite sides of the engine and in advance of the cylinders, air being admitted to said fans through hooded or downwardly turned inlets 8, 8, which substantially prevent the entrance of foreign matter. The fans may be of any desired or suitable type and are provided with outlet flues or conduits 9, 9, which at their upper ends communicate with a compartment 10 through rectangular openings 11, 11 in the front wall thereof. Compartment 10 is divided off from the smoke-box of the locomotive by a curved partition 12, which at its bottom edge 13 is secured to the front boiler sheet and at its upper edge 14 extended horizontally and secured to the front wall of the boiler extension so that the space or compartment 10 is completely closed off from the smoke-box 3 and the smoke-stack 2. Smoke-stack 2 and smoke-box 3 are in communication as usual and steam is fed from the dry pipe through a branch connection 15 to steam pipes 16, 16 leading to the respective steam chests of the cylinders. This construction of passages for conducting steam from the dry pipe to the steam chest may be of any usual or approved type.

From the valve chests the steam is led to a union 17 which communicates with a radiator 18 within the space or compartment 10, said radiator comprising a number of spaced elements 19 communicating with said union and with an annular steam passage 20 surrounding the smoke-stack. As seen more particularly in Fig. 1 the steam passage 20 entirely surrounds the smoke-stack and when steam is exhausted therefrom the valve chests through the radiator members and escapes around the top of the smoke-stack it exerts a very powerful ejector action upon the smoke and products of combustion thus forcing the draft of the locomotive fire-box. The air supplied to the space or compartment 10 flows through the narrow spaces between the steam elements of the radiator and is thereby heated and is further heated by contact with the curved partition plate 12 between the air space and the smoke-box. From the air space the heated air is led rearwardly by means of air conduits 21 upon opposite sides respectively of the boiler which communicate with the air space 10 at opposite sides through rectangular openings 22 shown in dotted lines in Fig. 1.

Conduits 21 which are preferably oblong in cross-section and arranged to lie beneath the running-boards 23 extend downwardly toward their rear ends as at 24 and communicate with a hollow air jacket or chamber 25 extending beneath the fire-box of the locomotive, in which jacket the air is further heated before passing by the twin flues 26 to the carbureters or mixers 27, 27 arranged at the rear of the locomotive as shown more particularly in Figs. 2, 5 and 6. So far as the present invention is concerned the carbureters may be of any desired type and communicate at their forward ends by conduits 28 and tubes 29 with the interior of the fire-box for the purpose of supplying the latter with the carbureted air or mixture of pulverized fuel and air.

The fire-box, as shown in Figs. 2 and 6, is divided by baffles 30, 31 which are curved in longitudinal section, as shown, and formed of fire-brick resting upon suitable supporting members 32, 33. Baffle wall 30 is curved as shown and formed at its forward end with openings 34, 35, while baffle 31 extends only partially toward the top of the fire-box leaving a space above the same for the passage of the burning material. The fire-box is formed with a concave hearth 36 which receives the melted ash components of the fuel and discharges them through an opening 37 into the ash-pit 38. The passage of carbureted air or combustible mixture from the carbureters 27 may be controlled by valves 39 connected by links 40 with an arm 41 on shaft 42, the last-named being provided with a handle 43 for operating same (see Figs. 2 and 5).

The fuel is as usual carried in the tender, the forward end of which is formed into a fuel box 44 (see Figs. 2 and 7) in the bottom of which are longitudinal grooves 45, 46 and 47, each containing a worm shaft conveyer 48, 49, 50. Conveyers 48 and 50 are larger than the intermediate conveyer 49 for a reason which will presently appear. The front end of the hopper or fuel box is inclined at 51 and within the reëntrant space so formed project cylindrical chambers 52 into which the forward ends of the screw conveyers extend. At the front end of each side chamber the corresponding screw shaft is provided with a worm wheel 53 for driving said shaft, and the intermediate conveyer 49 is provided with a worm wheel 78. Intermediate the ends of each outer chamber 52 is arranged an outlet 54 connected to a valve chamber 55 whence leads a rigid pipe section 56, the upper end of which is formed with a union 57 adapted to be connected by the flexible pipe 58 with a similar union 59 on the carbureter 27. This construction is found on opposite sides of the fuel box and serves to carry the fuel, mixed with air in a manner to be presently described, to the carbureters.

The intermediate chamber to which the trough 46 and conveyer 49 lead is provided with a smaller outlet and connection 60 to a pilot carbureter 61 leading to a burner 62 opening as shown at 63 through the hearth of the fire-box. By this conduit 60 said pilot burner is supplied with a mixture of fuel and air. The air is supplied to the several troughs 45, 46 and 47 from a fan 64 which is connected to a transverse pipe 65 having branches as at 66 leading into the respective troughs near the outlet ends thereof. The air from the fan blowing into the respective troughs finds a path of least resistance through the outlets 54 and escapes to the carbureters 27 and 61 carrying the powdered fuel with it. The fuel driven to the carbureters is insufficiently supplied with air for its complete combustion, but in the carbureters it is mixed with further quantities of air delivered through the branch pipes 26 in a manner which need not be here described since the particular construction of these carbureters forms no part of the present invention. The pilot carbureter 61 receives an additional supply of air from the fan 64 through the conduit 67.

The means for driving the fans and screw conveyer can best be understood by reference to Figs. 2, 8 and 9. Preferably I employ a turbine 68 upon the shaft of which is mounted the fan 64 which is constantly driven whenever the turbine is operated. The shaft 70 of the turbine carries a pair of gear wheels 71, 72 which are loosely mounted thereon but adapted to be connected thereto by a sliding clutch 73 which may be of any usual or approved form. The gear 71 meshes with the large gear 74 upon a transverse shaft 75 parallel to the shaft 70 and upon said shaft 75 are mounted worms 76, 77 which engage the worm wheels 53 heretofore described for driving the screw conveyers. The intermediate screw conveyer 49, however, which feeds the pilot carbureter is driven by the engagement of its worm wheel 78 with a worm 79 upon the sleeve 80 surrounding said transverse shaft 75 and free to turn thereon. Said sleeve also carries a gear wheel 81 which meshes with the gear 72 referred to above. By shifting the clutch either gear 71 or 72 is driven and hence either the gear 74 driving the large worm conveyers or the gear 81 driving the small intermediate conveyer may be put into motion as desired. The clutch is shifted by a handle 82 which is also connected by a link 83 to lever 84 controlling valve 85 in the conduit leading from the small intermediate conveyer and trough to the pilot carbureter and by a link 86 to a lever 87 of a valve 88 controlling the air supply from the fan 64 to said pilot carbureter, said valve being located in the conduit 67. Furthermore, the same lever 82 is connected by a rod 89 to the operating levers 90 of valves 55 controlling the supply of mixed air and fuel to the carbureters 27. The connections of the valves and clutch to the lever are such that when the lever is moved to the right, as seen in Fig. 8, the intermediate conveyer is set in motion and the connections from said conveyer and from the fan to the pilot carbureter are opened and when the lever is moved to the left the larger conveyers are both set in motion and their connections to the carbureters 27 are opened. Thus a single motion of the lever puts into operation either the pilot carbureter or the main carbureters, as desired by the operator. At the same time that the main conveyers are put in operation and their connections to the respective carbureters opened the supply of air to the main carbureters through the conduits 26 is enabled by operating the handles 91 connected by links 92 to levers 93 of valves 94 in the conduits 26, thus furnishing the additional supply of air needed for combustion.

The fans 7 on the front of the engine are operated by an intermediate turbine 95, the wheel of which is fixed upon the shaft of said fans and which is supplied with operating steam through a pipe 96 (see Figs. 1 and 2) connected at 97 to an offset 98 which is open to the steam space of the boiler. A valve operated by handle 99 controls the admission of steam to said pipe. A pipe 100 connected to the same space and controlled by valve 101 conducts steam to the turbine 68 which drives the fan on the tender, a detachable flexible connection 102 being used between the sections of pipe 100.

The operation of the device will be understood from the foregoing description. When the device is in operation and the engine is making steam, the front turbine is placed in communication with the steam space through the pipe 96 before mentioned, and drives the fans 7 by means of which air is forced through the air chamber 10, the conduits 21, the air jacket beneath the fire-box and to the main carbureters. The exhaust steam from the cylinders escaping through the radiators heats the air passing about the latter and then escapes through the annular nozzle about the smoke stack to force the draft thereof. At the same time steam is supplied to the turbine on the tender thereby operating the same, the fan on the tender and the main conveyers, the clutch of the shaft being suitably arranged for this purpose. The air driven into the forward ends of the conveyer troughs escapes into the conduits leading to the main capes carrying with it the powdered fuel supplied by the conveyers. When for any reason it is desired to shut down the production of steam the hand lever 82 is shifted to throw out of operation the main carbureters and their conveyers and to throw into operation the pilot carbureter and its conveyer. At the same time, but by different operations, the gates controlling the passages from the main carbureters to the fire-box are closed and the supplemental supplies of air to the main carbureters are closed off. Also the supply of steam to the turbine driving the fans at the front of the engine is cut off. The pilot flame ignites and continues to burn thus maintaining the fire-box heated, but at much less expense than were the main carbureters and their burners in operation. In starting the engine after it has been entirely out of service the steam pipes for driving the turbines may be connected up in an obvious manner to any outside source of steam such as is commonly available at engine round houses.

I claim:

1. In a locomotive and in combination with the boiler, fire-box, stack and cylinders thereof, means for preheating the air for combustion in the firebox, comprising an air-heating chamber, a radiator therein having steam and air passages, connections between the cylinders and the steam passages of the radiator for supplying the latter with steam, a steam nozzle so related to the stack as to increase the draft therein, a connection from the steam passages of the radiator to the nozzle, means for supplying the air passages of the radiator with air, and connections from said air chamber for utilizing the air heated therein in the fire-box.

2. In a locomotive and in combination with the boiler, stack and cylinders thereof, means for preheating the air for combustion in the fire-box comprising an air-heating chamber, a radiator therein having substantially horizontal air-passages therethrough and substantially vertical steam passages, connections from the steam passages to the cylinders of the engine, a nozzle so related to the stack as to increase draft therein, connections from the steam passages of the radiator to the nozzle, means for supplying the air chamber with air and conduits for leading the heated air to the fire-box.

3. In a locomotive and in combination with the boiler, stack and cylinders thereof, a boiler extension divided to form a smoke-box and an air-preheating chamber, the smoke-box being open to the stack, means for supplying the air-preheating chamber with air, means for withdrawing the heated air, a steam radiator in the air-preheating chamber, connections from the cylinders of the engine to the radiator, a nozzle so related to the stack as to increase the draft therein, and connections from said nozzle to the radiator.

4. In a locomotive and in combination with the boiler, stack, cylinders and fire-box thereof, a boiler extension comprising a smoke-box communicating with the boiler tubes and an air preheating chamber, the smoke-box also communcating with the stack, an annular steam passage surrounding the stack, a radiator in the air preheating chamber having steam and air passages, the steam passages being connected to the annular steam passage surrounding the stack, and connections from the cylinders to the steam passages of said radiator.

5. In a locomotive and in combination with the boiler, stack, cylinders and fire-box thereof, means for preheating air for combustion in the fire-box comprising an air-heating chamber, means for supplying said chamber with air to be heated and for conveying said air to the fire-box, a radiator in the air preheating chamber comprising steam and air passages, connections from the cylinders to the steam passages of the radiator, an annular steam passage surrounding the stack and connections from the steam passages of the radiator to said annular steam passage.

6. In a locomotive and in combination with the boiler, stack, fire-box and cylinders thereof, means for preheating air for combustion in the fire-box, comprising an air preheating chamber, a fan mounted on the locomotive, a conduit connecting the fan to the air preheating chamber for conducting the air from the fan to the chamber, means for rotating the fan, a steam radiator located in the air-preheating chamber having steam and air passages, connections from the steam passages of said radiators to the cylinders of the engine, a nozzle arranged with respect to said stack to increase the draft therein and connections from the steam passages of the radiator to the nozzle.

7. In a locomotive and in combination with the boiler, stack, fire-box and cylinders thereof, means for preheating air for use in the fire-box comprising an air preheating chamber, a radiator having steam and air passages located in said chamber, connections from the steam passages to the cylinders of the engine, a steam space surrounding the stack and connected to the steam passages of the radiator, a pair of air pumps arranged on respectively opposite sides of the engine and having intakes open to the atmosphere, connections from the exhausts of said fan to the air preheating chamber, and connections from the air preheating chamber to the fire-box.

ALONZO G. KINYON.